(12) United States Patent
Okada et al.

(10) Patent No.: US 7,008,557 B2
(45) Date of Patent: Mar. 7, 2006

(54) PRODUCTION METHOD OF PHOSPHOR AND PHOSPHOR

(75) Inventors: Hisatake Okada, Tachikawa (JP); Satoshi Ito, Hino (JP); Takayuki Suzuki, Hachioji (JP); Hideki Hoshino, Kunitachi (JP); Naoko Furusawa, Hino (JP)

(73) Assignee: Konica Corporation, Tokyo (JP)

( * ) Notice: Subject to any disclaimer, the term of this patent is extended or adjusted under 35 U.S.C. 154(b) by 65 days.

(21) Appl. No.: 10/391,395

(22) Filed: Mar. 18, 2003

(65) Prior Publication Data

US 2003/0178603 A1    Sep. 25, 2003

(30) Foreign Application Priority Data

Mar. 25, 2002  (JP) .............................. 2002-082916

(51) Int. Cl.
*G21K 4/00*    (2006.01)

(52) U.S. Cl. .......................... 252/301.4 R; 252/301.5; 252/301.4 S; 252/301.4 F; 252/301.4 P; 252/301.4 H; 252/301.6 R; 252/301.6 S; 252/301.6 P; 252/301.6 F

(58) Field of Classification Search ......... 252/301.4 R, 252/301.4 S, 301.4 F, 301.4 H, 301.4 P, 252/301.5, 301.6 R, 301.6 S, 301.6 F, 301.6 P
See application file for complete search history.

(56) References Cited

U.S. PATENT DOCUMENTS

| | | | | |
|---|---|---|---|---|
| 5,100,598 A | * | 3/1992 | Dole et al. .................. | 264/1.22 |
| 5,413,736 A | * | 5/1995 | Nishisu et al. ......... | 252/301.4 R |
| 5,637,258 A | * | 6/1997 | Goldburt et al. ...... | 252/301.4 R |
| 5,994,831 A | * | 11/1999 | Van der Voort et al. .... | 313/486 |
| 6,039,894 A | * | 3/2000 | Sanjurjo et al. ...... | 252/301.4 R |
| 6,060,828 A | * | 5/2000 | Vollkommer et al. ........ | 313/607 |
| 6,090,200 A | * | 7/2000 | Gray et al. .................... | 117/68 |
| 6,117,363 A | * | 9/2000 | Ihara et al. ........... | 252/301.6 S |
| 6,143,201 A | * | 11/2000 | Mano .................... | 252/301.6 S |
| 6,338,809 B1 | * | 1/2002 | Hampden-Smith et al. .... | 264/7 |
| 6,391,273 B1 | * | 5/2002 | Konrad et al. .............. | 423/263 |
| 6,466,135 B1 | * | 10/2002 | Srivastava et al. ........ | 340/815.4 |
| 6,827,878 B1 | * | 12/2004 | Nakatsu ............... | 252/301.4 H |
| 2004/0041126 A1 | * | 3/2004 | Nakatsu ............... | 252/301.4 H |

* cited by examiner

Primary Examiner—C. Melissa Koslow
(74) Attorney, Agent, or Firm—Lucas & Mercanti, LLP

(57) ABSTRACT

The present invention relates to a production method of a phosphor comprising the steps of: forming a phosphor precursor in a liquid phase; drying the phosphor precursor; and firing the dried phosphor precursor to obtain the phosphor. At least one of the forming step, drying step and firing step is conducted in the presence of a binder.

10 Claims, 1 Drawing Sheet

PRODUCTION METHOD OF PHOSPHOR AND PHOSPHOR

TECHNICAL FIELD

The present invention relates to a production method of phosphors and the phosphors which are prepared employing the method, and in more detail to a production method of phosphors which are suitably employed for various types of flat panel displays such as plasma display panels, cathode ray tubes, fluorescent lamps, ink for ink jet printing, electrophotographic toner, and silver halide light-sensitive photographic materials, and also relates to the phosphors which are prepared employing the aforesaid method.

BACKGROUND

In recent years, under the progress of information-oriented society, as symbolized by high-vision Braun tubes and high resolution display tubes, various types of flat panel displays such as plasma displays and color cathode ray tubes, such as color Braun tubes, have been undergoing a continuing increase in image size and contrast. In addition, it has become necessary to form increasingly minute pixels on the faceplate to form high-resolution screens.

Consequently, enhancements of various characteristics such as an increase in emission luminance and the enhancement of adhesion of phosphors onto the surface of the faceplate have been sought.

In phosphors, which have been used in panel displays, particles having a diameter of about 2 to about 7 $\mu$m, are used which have been developed for color cathode ray tubes. Further, the excitation wavelength of the aforesaid phosphors have not been developed which is optimized for each flat panel display. As a result, hereafter, enhancements of various characteristics are still being sought. Particularly, as the display is more detailed in the future, minute phosphor particles which exhibit high luminance are sought.

Conventional phosphors which have been prepared utilizing crystal growth through firing exhibit a relatively wide particle size distribution. Particuialarly, when burned employing a large amount of fusing agents, phosphors which exhibit a normal distribution are prepared. When a phosphor layer is formed employing such phosphors, the presence of minute particles as well as coarse particles is not preferred, in order to prepare a denser phosphor layer which results in higher luminance. If desired, these minute particles as well as coarse particles are removed through a classification operation. However, such a classification operation results in a low efficient work which leads to a decrease in yield. Specifically, the formation of coarse particles adversely affects the yield of particles having the desired particle diameter. Further, it is impossible to remove such coarse particles with any degree of assurance.

Accordingly, in order to form a phosphor layer for high resolution cathode ray tubes, it is essential that unnecessary minute particles, and particularly coarse particles, are not formed during firing.

In order to overcome the aforesaid problems, Japanese Unexamined Patent Application Publication No. (JP-A) 2001-329262 describes a technique in which the crystal habit of phosphors is controlled so that minute particles, and particularly coarse particles, are not formed during firing.

Further, as the diameter of conventional phosphor particles decreases which are prepared utilizing crystal growth through firing, the resulting emission efficiency as well as emission luminance decreases. As a result, almost no phosphors are currently commercially available which exhibit sufficient emission efficiency as well as emission luminance at a particle diameter of at most 1 $\mu$m.

Several production methods for phosphors comprised of particles, having a diameter of at most 1 $\mu$m, have been disclosed. As is disclosed in JP-A 8-81676, particles having a diameter of at most 1 $\mu$m are obtained employing a classification operation, but with resulting problems such as a decrease in phosphorescence luminance as well as a decrease in the yield.

In each step of production method of phosphors, particle coagulation results in an increase in the resulting particle diameter and greatly hinders preparation of more minute particles incorporated in phosphors. However, few inventions can be found which relate to minimization of the aforesaid drawbacks. Only JP-A 6-306358 describes a sintering inhibitor. However, the resulting effects (being particle coagulation minimizing effects) have been found to be insufficient.

SUMMARY OF THE INVENTION

An aspect of the present invention is to provide a production method of phosphors, which exhibit desired emission intensity, while making it possible to minimize coagulation of size-reduced particles in phosphors, and phosphors which are prepared employing the aforesaid method.

The aforesaid aspect of the present invention can be achieved employing the embodiments described below.

One of the embodiments of the present invention is a production method of a phosphor comprising the steps of: forming a phosphor precursor in a liquid containing an inhibitor; drying the phosphor precursor; and firing the dried phosphor precursor to obtain the phosphor.

Another embodiment of the presents invention is a production method of phosphor comprising the steps in the order: forming a phosphor precursor in a liquid; adding an inhibitor into the liquid comprising the formed phosphor precursor; drying the phosphor precursor in the presence of the inhibitor; and firing the phosphor precursor to obtain the phosphor.

Still other embodiment of the present invention is a production method of a phosphor comprising the steps in the order: forming a phosphor precursor in a liquid; drying the phosphor precursor; mixing the phosphor precursor with an inhibitor; and firing the phosphor precursor in the presence of the inhibitor to obtain the phosphor.

Figure 1:
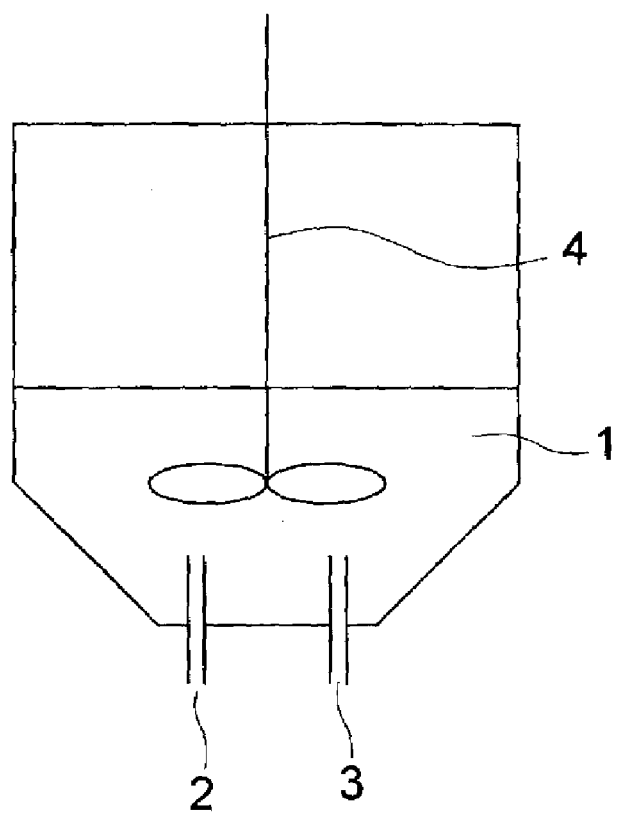
FIG. 1 is a schematic view showing one example of an apparatus which is used to synthesize phosphor precursors.

The present invention will now be detailed.

The production method of phosphors of the present invention preferably comprises a phosphor precursor forming step which forms phosphor precursors (hereinafter sometimes referred simply to as a precursor) by blending phosphor raw materials, a drying process which dries phosphor precursors, and a firing process which adequately heats the aforesaid phosphor precursors to prepare the phosphors.

Phosphor precursors in the present invention are defined as intermediate compounds of phosphors to be produced. Phosphors are obtained by drying and firing the phosphor precursors at a specified temperature for a specified time.

Incidentally, the temperature of the aforesaid drying process is customarily 40 to 1,000° C., is preferably 60 to 300° C., and is more preferably 80 to 100° C. The time of the aforesaid drying process is customarily 0.01 second to one week, is preferably 1 second to 24 hours, and is more preferably 10 seconds to 12 hours.

Further, the temperature of the aforesaid firing process is customarily 600 to 1,800° C., is preferably 800 to 1,600° C., and is more preferably 1,000 to 1,550° C. The time of the aforesaid firing process is customarily 0.01 second to 24 hours, is preferably 1 second to 8 hours, and is more preferably 10 seconds to 6 hours.

Still further, in the production method of phosphors of the present invention, the phosphor precursors is formed preferably in the liquid containing inhibitors. In the drying process in which the phosphor precursors are dried, is carried out preferably in the presence of inhibitors. Further, after drying the phosphor precursors, the firing process is carried out preferably in the presence of inhibitors.

The inhibitors of the present invention are defined as materials capable of inhibiting a coagulation of size-reduced minute particles with each other. The presence of the inhibitors results in the desired emission intensity.

Employed as the aforesaid inhibitors are preferably polymers, irrespective of natural and synthetic products. In such a case, the average molecular weight of the aforesaid inhibitors is preferably at least 10,000, is more preferably 10,000 to 300,000, and is most preferably 10,000 to 30,000.

Further, the inhibitors of the present invention are preferably proteins, and are more preferably gelatins.

Further, the aforesaid inhibitors need not be a single composition but may be a mixture of various types of inhibitors. For example, it is possible to use graft polymers of the aforesaid gelatin with other polymers.

As the inhibitors of the invention, minute particles of silica, alumina and carbon can be used, as long as the particles are capable of inhibiting a coagulation of the objective minute particles.

The average diameter of the phosphor particles in the present invention is preferably at most 1.0 $\mu$m, is more preferably at most 0.8 $\mu$m, is still more preferably at most 0.5 $\mu$m, and is most preferably 0.01 to 0.3 $\mu$m.

The average diameter of phosphor particles is the average value of the diameter of 300 phosphor particles, which are measured employing an electron microscope (S-900, produced by Hitachi Seisakusho).

Size-reduced particles, as described in the present invention, refer to particles having a diameter of at most 1.0 $\mu$m and "size-reduced" means that the average diameter of phosphor particles is in the aforesaid range.

The variation coefficient of the particle size distribution of the phosphors of the present invention is preferably at most 100 percent, is more preferably at most 50 percent, and is most preferably at most 30 percent. Variation coefficient of the particle size distribution, as described herein, is a value which is defined employing the formula described below.

(Standard deviation of the particle size/average of the particle size)×100=variation coefficient of particle size distribution) (in percent)

It is possible to synthesize the phosphor precursors in the present invention in the liquid containing the aforesaid inhibitors, utilizing any of the liquid phase reactions known in the art. Specifically, preferred are those which are synthesized employing a reaction crystallization method or a sol-gel method.

The production method utilizing the aforesaid sol-gel method means that atoms (metals) employed in main components, activators, or co-activators, are added, for example, to metal alkoxides such as $Si(OCH_3)_4$ and $Eu^{3+}$ $(CH_3COCH=C(O^-)CH_3)_3$, metal complexes, or double alkoxides (such as $Mg[Al(OBu)_3]_2$ which is prepared by adding magnesium to an $Al(OBu)_3$ 2-butanol solution), which are prepared by adding metal as a simple substance to a metal complex or an organic solvent solution thereof), metal halides, and metal salts of organic acids in a necessary amount as metal as a simple substance, and the resulting mixture thermally or chemically undergoes polymerization condensation.

Further, specifically, when prepared employing the aforesaid sol-gel method, the resulting phosphor precursor solution or a composition comprising primary particles is subjected to patterning onto a transparent substrate, employing a printing method or an ink jet printing method, and thereafter, a crystallization process such as firing and reduction processes or a luminance enhancing process may be applied.

If desired, phosphor compounds may be subjected to surface modification and enhancement in dispersibility, employing surface modifiers, surfactants, and matting agents such as minute silica gel particles, Aerosil, or alumina.

Compositions of inorganic phosphor compounds, which are preferably employed in the present invention, are not particularly limited. However, it is preferable that metal oxides, represented by $Y_2O_2S$, $Zn_2SiO_4$, $Ca_5(PO_4)_3Cl$ as main crystal components, and sulfides represented by ZnS, SrS, and CaS, are combined with ions of rare earth metals such as Ce, Pr, Nd, Pm, Sm, Eu, Gd, Tb, Dy, Ho, Er, Tm, and Yb as an ion activator or a co-activator. Preferred examples of main crystal components are listed below.

ZnS, $Y_2O_2S$, $Y_3Al_5O_{12}$, $Y_2SiO_3$, $Zn_2SiO_4$, $Y_2O_3$, $BaMgAl_{10}O_{17}$, $BaAl_{12}O_{19}$, $(Ba,Sr,Mg)O \cdot aAl_2O_3$, $(Y,Gd)BO_3$, $YO_3$, $(Zn,Cd)S$, $SrGa_2S_4$, SrS, GaS, $SnO_2$, $Ca_{10}(PO_4)_6(F,Cl)_2$, $(Ba,Sr)(Mg,Mn)Al_{10}O_{17}$, $(Sr, Ca, Ba, Mg)_{10}(PO_4)Cl_{12}$, $(La,Ce)PO_4$, $CeMgAl_{11}O_{19}$, $GdMgB_5O_{10}$, $Sr_2P_2O7$, and $Sr_4Al_{14}O_{25}$.

The aforesaid main crystal components, activators, and co-activators may be employed in which atom(s) in the compounds are replaced with congeners. Element compositions are not particularly limited as long as are capable of absorbing ultraviolet rays to emit visible light.

Inorganic phosphor compounds which are employed in the production method of the phosphors of the present invention are shown below. However, the present invention is not limited to these compounds.

(Blue Light Emission: Inorganic Phosphor Compounds)
(BL-1) $Sr_2P_2O_7:Sn^{4+}$
(BL-2) $Sr_4Al_{14}O_{25}:Eu^{2+}$
(BL-3) $BaMgAl_{10}O_{17}:Eu^{2+}$
(BL-4) $SrGa_2S_4:Ce^{3+}$
(BL-5) $CaGa_2S_4:Ce^{3+}$
(BL-6) $(Ba,Sr)(Mg,Mn)Al_{10}O_{17}:Eu^{2+}$
(BL-7) $(Sr,Ca,Ba,Mg)_{10}(PO_4)_6Cl_2:Eu^{2+}$ (Green Light Emission: Inorganic Phosphor Compounds)
(GF-1) $BaMg_2Al_{16}O_{27}:Eu^{2+}, Mn^{2+}$
(GF-2) $Sr_4Al_{14}O_{25}:Eu^{2+}$
(GF-3) $(Sr,Ba)Al_2Si_2O_8:Eu^{+2}$
(GF-4) $(Ba,Mg)_2SiO_4:Eu^{2+}$
(GF-5) $Y_2SiO_5:Ce^{+3},Tb^{3+}$
(GF-6) $Sr_2P_2O_7—Sr_2B_2O_5:Eu^{2+}$
(GF-7) $(Ba, Ca, Mg)_5(PO_4)_3Cl:Eu^{2+}$
(GF-8) $Sr_2Si_3O_8—2SrCl_2:Eu^{2+}$
(GF-10) $Ba_2SiO_4:Eu^{2+}$ (Red Light Emission: Inorganic Phosphor Compounds)
   (RL-1) $Y_2O_2S:Eu^{3+}$
   (RL-5) $YVO_4:Eu^{3+}$
   (RL-6) $CaS:Eu^{2+}$ The use of phosphors which are obtained employing the production method of phosphors of the present invention will now be listed. However, the use of phosphors of the present invention is not limited to these.

The phosphors of the present invention are employed as phosphors for flat panel displays such as plasma display panels, field emission displays, and UV emitting organic electroluminescence displays, phosphors for color cathode ray tubes, phosphors for coloring materials and media such as ink for ink jet printing, electrophotographic toner, and silver halide light-sensitive photographic materials, as well as phosphors for intensifying screens.

EXAMPLES

The present invention will now be detailed with reference to examples. However, the embodiments of the present invention are not limited to these examples.

Example 1

(Preparation of Phosphor 1)

Water in an amount of 1,000 ml was designated as Solution A, which is illustrated by 1 in FIG. 1.

Oxalic acid was dissolved in 500 ml of water to obtain an oxalic acid ion concentration of 1.08 mol/L. The resulting solution was designated as Solution B, which is illustrated by 2 in FIG. 1.

Yttrium nitrate and europium nitrate were dissolved in 500 ml of water to obtain an yttrium ion concentration of 0.72 mol/L and a europium ion concentration 0.036 mol/L. The resulting solution was designated as solution C, which is illustrated by 3 in FIG. 1.

Solution A was charged into a reaction vessel as shown in FIG. 1 and was stirred at 60° C. employing stirring blades, which is illustrated by 4 in FIG. 1. In such a state, Solutions B and C, also maintained at 60° C., were added at a constant flow rate of 60 ml/minute through nozzles arranged at the bottom of the reaction vessel in which Solution A had been placed. After the addition, ripening was carried out for 10 minutes, whereby Precursor 1 was obtained. The resulting Precursor 1 was collected through filtration and dried (at 105° C. for 16 hours), whereby dry Precursor 1 was produced.

Subsequently, dry Precursor 1 was subjected to firing under oxidation conditions of 1,200° C. for two hours, whereby Phosphor 1 was produced.

(Preparation of Phosphor 2)

Dissolved in 1,000 ml of water was 30 g of gelatin (having an average molecular weight of approximately 100,000). The resulting solution was designated as Solution A.

Oxalic acid was dissolved in 500 ml of water to obtain an oxalic acid ion concentration of 1.08 mol/L. The resulting solution was designated as Solution B.

Yttrium nitrate and europium nitrate were dissolved in 500 ml of water to obtain an yttrium ion concentration of 0.72 mol/L and a europium ion concentration 0.036 mol/L. The resulting solution was designated as solution C.

Solution A was charged into a reaction vessel as shown in FIG. 1 and was stirred at 60° C. employing stirring blades. In such a state, Solutions B and C, also maintained at 60° C., were added at a constant flow rate of 60 ml/minute through nozzles arranged at the bottom of the reaction vessel in which Solution A had been placed. After the addition, ripening was carried out for 10 minutes, whereby Precursor 2 was obtained. Thereafter, the resulting Precursor 2 was collected through filtration and dried (at 105° C. for 16 hours), whereby dried Precursor 2 was produced.

Subsequently, dry Precursor 2 was subjected to firing under oxidation conditions of 1,200° C. for two hours, whereby Phosphor 2 was produced.

(Preparation of Phosphor 3)

Dissolved in 1,000 ml of water was 30 g of gelatin (having an average molecular weight of about 20,000). The resulting solution was designated as Solution A.

Oxalic acid was dissolved in 500 ml of water to obtain an oxalic acid ion concentration of 1.08 mol/L. The resulting solution was designated as Solution B.

Yttrium nitrate and europium nitrate were dissolved in 500 ml of water to obtain an yttrium ion concentration of 0.72 mol/L and a europium ion concentration 0.036 mol/L. The resulting solution was designated as Solution C.

Solution A was charged into a reaction vessel as shown in FIG. 1 and was stirred at 60° C. employing stirring blades. In such a state, Solutions B and C, also maintained at 60° C., were added at a constant flow rate of 60 ml/minute through nozzles arranged at the bottom of the reaction vessel in which Solution A had been placed. After the addition, ripening was carried out for 10 minutes, whereby Precursor 3 was obtained. Thereafter, the resulting Precursor 3 was collected through filtration and dried (at 105° C. for 16 hours), whereby dry Precursor 3 was produced.

Further, dried Precursor 3 was subjected to firing under oxidation conditions of 1,200° C. for two hours, whereby Phosphor 3 was produced.

(Preparation of Phosphor 4)

Water in an amount of 1,000 ml was designated as Solution A.

Oxalic acid was dissolved in 500 ml of water to obtain an oxalic acid ion concentration of 1.08 mol/L. The resulting solution was designated as Solution B.

Yttrium nitrate and europium nitrate were dissolved in 500 ml of water to obtain an yttrium ion concentration of 0.72 mol/L and a europium ion concentration 0.036 mol/L. The resulting solution was designated as Solution C.

Solution A was charged into a reaction vessel as shown in FIG. 1 and was stirred at 60° C. employing stirring blades. In such a state, Solutions B and C, also maintained at 60° C., were added at a constant flow rate of 60 ml/minute through nozzles arranged at the bottom of the reaction vessel in which Solution A had been placed. After the addition, ripening was carried out for 10 minutes, whereby Precursor 1 was produced. Thereafter, dissolved in the resulting suspension comprising Precursor 1 was 30 g of gelatin (having a molecular weight of about 100,000). A product was collected through filtration and dried (at 105° C. for 16 hours), whereby dry Precursor 4 was produced.

Further, dried Precursor 4 was subjected to firing under oxidation conditions of 1,200° C. for two hours, whereby Phosphor 4 was produced.

(Preparation of Phosphor 5)

Water in an amount of 1,000 ml was designated as Solution A.

Oxalic acid was dissolved in 500 ml of water to obtain an oxalic acid ion concentration of 1.08 mol/L. The resulting solution was designated as Solution B.

Yttrium nitrate and europium nitrate were dissolved in 500 ml of water to obtain an yttrium ion concentration of 0.72 mol/L and a europium ion concentration 0.036 mol/L. The resulting solution was designated as Solution C.

Solution A was charged into a reaction vessel as shown in FIG. 1 and was stirred at 60° C. employing stirring blades. In such a state, Solutions B and C, also maintained at 60° C., were added at a constant flow rate of 60 ml/minute through nozzles arranged at the bottom of the reaction vessel in which Solution A had been placed. After the addition, ripening was carried out for 10 minutes, whereby Precursor 1 was produced. Thereafter, Precursor 1 was collected through filtration and dried (at 105° C. for 16 hours), whereby dry Precursor 1 was produced. Dry Precursor 1 and 30 g of gelatin (having an average molecular weight of about 100,000) were mixed and dissolved, and subjected to firing under oxidation conditions of 1,200° C. for 2 hours, whereby Phosphor 5 was obtained.

Emission intensity was determined as follows. Each sample prepared as above was irradiated with UV radiation at a wavelength of 254 nm and the relative emission intensity was determined with the emission intensity of Phosphor 1 being used as 100. Table 1 shows the results. (As particles are subjected to coagulation, the resulting emission intensity decreases.)

Further, the diameter of 300 particles in each phosphor was measured employing the aforesaid electron microscope, and the average was shown in Table 1 as the average particle diameter.

TABLE 1

|  | Relative Emission Intensity (%) | Average Particle Diameter ($\mu$m) | Remarks |
| --- | --- | --- | --- |
| Phosphor 1 | 100 | 1.18 | Comparative |
| Phosphor 2 | 120 | 0.27 | Inventive |
| Phosphor 3 | 125 | 0.15 | Inventive |
| Phosphor 4 | 114 | 0.45 | Inventive |
| Phosphor 5 | 110 | 0.72 | Inventive |

As can clearly be seen from Table 1, compared to Comparative Sample, Samples of the present invention result in no coagulation of size-reduced particles and exhibit sufficient emission intensity.

EFFECTS OF THE INVENTION

The production method of phosphors according to the present invention and phosphors which are prepared employing the aforesaid production method exhibit excellent effects in such a manner that the aforesaid phosphors enable minimized coagulation of size-reduced particles and also exhibit sufficient emission intensity.

What is claimed is:

1. A production method of a phosphor comprising the steps of:
   forming a phosphor precursor in a liquid containing an inhibitor;
   drying the phosphor precursor; and
   firing the dried phosphor precursor to obtain the phosphor.

2. The production method of claim 1, wherein the inhibitor is a polymer having an average molecular weight of not less than 10,000.

3. The production method of claim 2, wherein the inhibitor is a protein.

4. The production method of claim 3, wherein the inhibitor is a gelatin.

5. A production method of phosphor comprising the steps in the order:
   forming a phosphor precursor in a liquid;
   adding a polymer having an average molecular weight of not less than 10,000 as an inhibitor into the liquid comprising the formed phosphor precursor;
   drying the phosphor precursor in the presence of the inhibitor; and
   firing the phosphor precursor to obtain the phosphor.

6. The production method of claim 5, wherein the inhibitor is a protein.

7. The production method of claim 6, wherein the inhibitor is a gelatin.

8. A production method of a phosphor comprising the steps in the order:
   forming a phosphor precursor in a liquid;
   drying the phosphor precursor;
   mixing the phosphor precursor with a polymer having an average molecular weight of not less than 10,000 as an inhibitor; and
   firing the phosphor precursor in the presence of the inhibitor to obtain the phosphor.

9. The production method of claim 8, wherein the inhibitor is a protein.

10. The production method of claim 9, wherein the inhibitor is a gelatin.

* * * * *